(12) United States Patent
Kish (10) Patent No.: US 9,707,878 B2
(45) Date of Patent: Jul. 18, 2017

(54) METHOD FOR MANUFACTURING A ONE-PIECE SEAT BACK STRUCTURE

(71) Applicant: JOHNSON CONTROLS TECHNOLOGY COMPANY, Holland, MI (US)

(72) Inventor: Joseph M. Kish, Canton, MI (US)

( * ) Notice: Subject to any disclaimer, the term of this patent is extended or adjusted under 35 U.S.C. 154(b) by 0 days.

(21) Appl. No.: 14/372,188

(22) PCT Filed: Jan. 25, 2013

(86) PCT No.: PCT/US2013/023059
§ 371 (c)(1),
(2) Date: Jul. 14, 2014

(87) PCT Pub. No.: WO2013/112787
PCT Pub. Date: Aug. 1, 2013

(65) Prior Publication Data
US 2015/0165948 A1 Jun. 18, 2015

Related U.S. Application Data

(60) Provisional application No. 61/591,071, filed on Jan. 26, 2012.

(51) Int. Cl.
*B21D 22/02* (2006.01)
*B60N 2/20* (2006.01)
(Continued)

(52) U.S. Cl.
CPC ............... *B60N 2/64* (2013.01); *B21D 11/10* (2013.01); *B21D 22/02* (2013.01); *B60N 2/20* (2013.01);
(Continued)

(58) Field of Classification Search
CPC ............ B60N 2/64; B60N 2/686; A47C 5/046
(Continued)

(56) References Cited

U.S. PATENT DOCUMENTS 3,822,462 A * 7/1974 Chubb ........................... 29/416
4,350,390 A * 9/1982 Ogawa ..................... A47C 5/00
297/452.18
(Continued)

FOREIGN PATENT DOCUMENTS

CN 201304915 Y 9/2009
CN 101573253 A 11/2009
(Continued)

OTHER PUBLICATIONS

JP Office Action Mailed Apr. 22, 2015.
(Continued)

*Primary Examiner* — Charles A. Fox
*Assistant Examiner* — Christopher E Veraa
(74) *Attorney, Agent, or Firm* — Fletcher Yoder, P.C.

(57) ABSTRACT

A method of manufacturing a seat back structure using a single piece of material. The method includes bending the single piece of material via a plurality of stamping processes to form the seat back structure. The seat back structure includes a web extending about a central opening, an inner flange extending about an inner perimeter of the web adjacent to the central opening, and an outer flange extending about an outer perimeter of the web. The inner flange is formed by bending via a first stamping process, and the outer flange is formed by bending via a second stamping process.

20 Claims, 7 Drawing Sheets

(51) Int. Cl.
  *B60N 2/64* (2006.01)
  *B60N 2/68* (2006.01)
  *B21D 11/10* (2006.01)

(52) U.S. Cl.
  CPC .............. *B60N 2/68* (2013.01); *B60N 2/686* (2013.01); *Y10T 29/49622* (2015.01)

(58) Field of Classification Search
  USPC .................................................... 297/452.18
  See application file for complete search history.

(56) References Cited

U.S. PATENT DOCUMENTS

| | | | |
|---|---|---|---|
| 6,378,946 B1* | 4/2002 | Cope et al. ................ | 297/452.2 |
| 6,386,638 B1* | 5/2002 | Strauch ................... | B60N 2/68 297/452.18 |
| 6,398,300 B1* | 6/2002 | Young ...................... | 297/216.13 |
| 6,607,247 B2* | 8/2003 | Becker et al. ............ | 297/452.18 |
| 7,866,689 B2* | 1/2011 | Saberan .................... | 280/730.2 |
| 2003/0076610 A1* | 4/2003 | Anderson et al. ........... | 359/892 |
| 2008/0164743 A1 | 7/2008 | Robert et al. | |
| 2009/0045658 A1* | 2/2009 | Humer ................ | B60N 2/4228 297/216.12 |
| 2010/0109415 A1* | 5/2010 | Roszczenko et al. ... | 297/452.18 |
| 2010/0219674 A1* | 9/2010 | Sakkinen et al. ........ | 297/452.18 |
| 2011/0043022 A1* | 2/2011 | Nasshan et al. ......... | 297/354.12 |
| 2011/0133529 A1* | 6/2011 | Guerrero ................. | 297/216.18 |
| 2011/0210596 A1* | 9/2011 | Zekavica et al. ........ | 297/452.18 |
| 2011/0278900 A1* | 11/2011 | Zekavica et al. .......... | 297/452.2 |
| 2012/0181839 A1* | 7/2012 | Michalak et al. ......... | 297/452.1 |
| 2012/0193954 A1* | 8/2012 | Sakkinen et al. ........ | 297/216.13 |
| 2012/0193965 A1* | 8/2012 | Saveski et al. .......... | 297/452.18 |
| 2012/0267935 A1* | 10/2012 | Zekavica et al. ........ | 297/452.18 |
| 2012/0273089 A1* | 11/2012 | Sakkinen et al. ............. | 148/218 |
| 2012/0306253 A1* | 12/2012 | Seibold et al. ............ | 297/354.1 |
| 2013/0161992 A1* | 6/2013 | Zekavica et al. .......... | 297/354.1 |
| 2013/0334862 A1* | 12/2013 | Gibbs ..................... | 297/452.18 |

FOREIGN PATENT DOCUMENTS

| | | |
|---|---|---|
| CN | 101774359 A | 7/2010 |
| CN | 102189950 A | 9/2011 |
| JP | S55-146119 A | 11/1980 |
| JP | S61-102149 U | 6/1986 |
| JP | H02-40235 U | 3/1990 |
| WO | 2011103501 A2 | 8/2011 |
| WO | 2011127289 A1 | 10/2011 |

OTHER PUBLICATIONS

International Preliminary Report on Patentability for PCT Application No. PCT/US2013/023059 dated Aug. 7, 2014; 7 pages.
CN Office Action Mailed Sep. 18, 2015.
Korean Application No. 10-2014-7023848 Office Action dated Oct. 10, 2015.

* cited by examiner

METHOD FOR MANUFACTURING A ONE-PIECE SEAT BACK STRUCTURE

CROSS REFERENCE TO RELATED APPLICATIONS

This application claims priority from and the benefit of PCT Application No. PCT/US2013/023059, filed on Jan. 25, 2013, and the benefit of U.S. Provisional Application Ser. No. 61/591,071, entitled "METHOD FOR MANUFACTURING A ONE-PIECE SEAT BACK STRUCTURE", filed Jan. 26, 2012, which is hereby incorporated by reference in its entirety.

BACKGROUND

The invention relates generally to vehicle seating, and more particularly, to a method of manufacturing a one-piece seat back structure.

Vehicle seating typically includes a seat bottom and a seat back to support a driver or passenger. In certain seating configurations, both the seat bottom and seat back include a structural assembly having a rigid structure, cushions, and a fabric covering. Each structural assembly may also include various ancillary structures, such as a recliner mechanism and a headrest support, for example. The structural assemblies are configured to support the weight of the passenger during normal vehicle operation, and to manage loads transferred to the seat during an impact.

Certain seat back structures are constructed from metal formed components. For example, a seat back structure may include a left side member, a right side member, a top cross member, and a bottom cross member, each constructed via a metal forming process. The members may be coupled to one another, e.g., via bolted or welded connections, to form the complete seat back structure. Seat back structures may also be formed from a single sheet of metal. For example, the single sheet of metal may be formed into the seat back structure via multiple drawing processes. Unfortunately, when a seat back structure is formed using drawing processes, an excessive amount of material may be wasted, thereby increasing production costs. Furthermore, the precision of the drawing processes may be insufficient to establish the desired tolerances of the seat back structure features. As a result, the features may not properly align with other portions of the vehicle seating assembly. Due to the strain placed on the material during the drawing process, reshaping the features on the seat back structure may not be feasible.

BRIEF DESCRIPTION OF THE INVENTION

The present invention relates to a method of manufacturing a seat back structure. The method includes bending a single piece of material via a plurality of stamping processes to form the seat back structure. The seat back structure includes a web extending about a central opening, an inner flange extending about an inner perimeter of the web adjacent to the central opening, and an outer flange extending about an outer perimeter of the web. The inner flange is formed by bending via a first stamping process, and the outer flange is formed by bending via a second stamping process.

The present invention also relates to a seat back structure formed from a single piece of material. The seat back structure includes a web extending about a central opening and an inner flange extending about an inner perimeter of the web adjacent to the central opening. The inner flange is formed by stamping the single piece of material. The seat back structure also includes an outer flange extending about an outer perimeter of the web. The outer flange is formed by stamping the single piece of material. The inner flange, the outer flange and the web form a channel extending about the seat back structure.

The present invention further relates to a method of manufacturing a seat back structure. The method includes cutting a single piece of material to a desired shape. The method also includes punching one or more holes in the single piece of material to form a mounting portion of the seat back structure. The method includes stamping the single piece of material to form the seat back structure. The seat back structure includes a web extending about a central opening, an inner flange extending about an inner perimeter of the web adjacent to the central opening, and an outer flange extending about an outer perimeter of the web. The inner flange, the outer flange and the web form a channel extending about the seat back structure.

DETAILED DESCRIPTION

Figure 1:
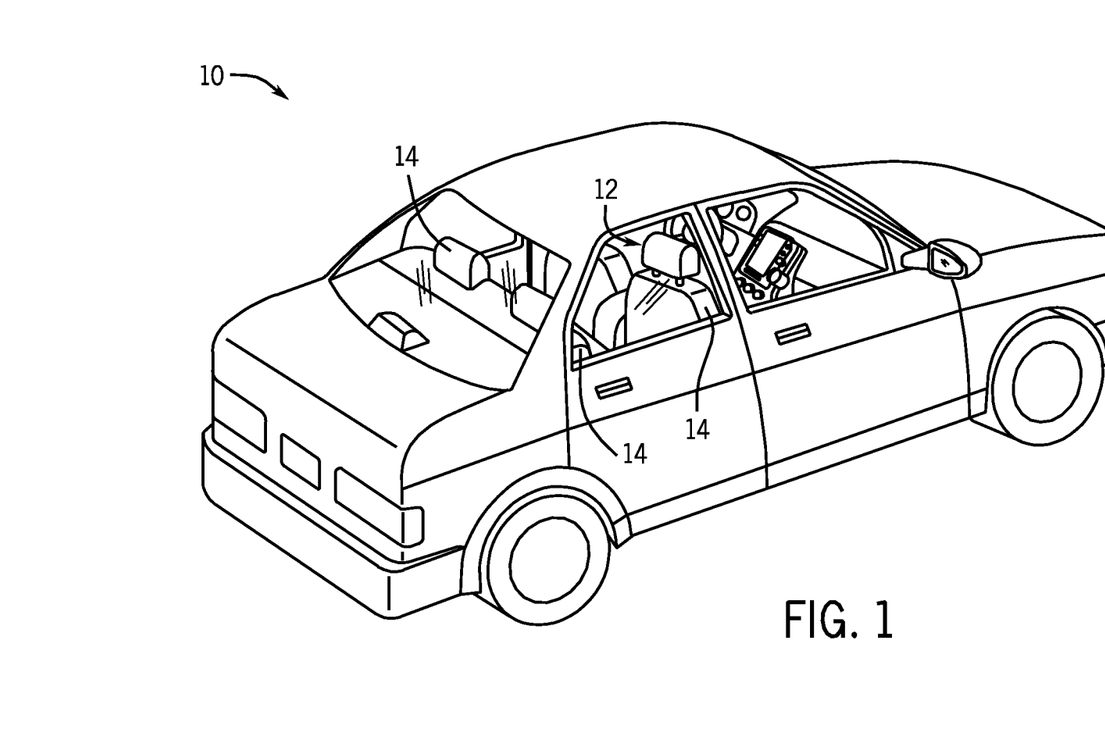
FIG. 1 is a perspective view of an exemplary vehicle that includes seats which may employ a one-piece seat back structure manufactured by bending via stamping processes.

Seat back structures may be formed from a single sheet of metal as described in International Application Serial No. PCT/US11/25531, entitled "ONE PIECE SEAT BACK STRUCTURE," filed Feb. 18, 2011, which is hereby incorporated by reference in its entirety. FIG. 1 is a perspective view of an exemplary vehicle that includes seats which may employ a one-piece seat back structure. As illustrated, the vehicle 10 includes an interior 12 having seats 14. As discussed in detail below, the seats 14 include a seat back structure formed from a single piece of material. For example, the seat back structure may be formed by bending the single piece of material via multiple stamping processes. Such a configuration may substantially reduce seat construction costs, as compared to seat backs formed by other processes, such as drawing. For example, seat backs formed by drawing may use a blank having sufficient material to facilitate formation of desired features as the blank is drawn. As a result, the size of the blank may be significantly larger than the completed seat back structure. Further, the drawing process may employ a high-tonnage press and/or a transfer die, thereby significantly increasing costs associated with forming the seat back structure. In addition, the precision of the drawing processes may be insufficient to establish the desired tolerances of the seat back structure features. As a result, the features may not properly align with other portions of the vehicle seating assembly.

In contrast, the present embodiment employs a progressive die to form the seat back structure from one piece of material (e.g., sheet metal) by bending the piece of material into the desired configuration via multiple stamping processes. As a result, the blank may be substantially smaller than the blank used in drawing processes, and a smaller/less powerful press may be utilized to bend the material into the desired shape. The smaller blank size may significantly reduce material costs, and the press may be exposed to less wear due to the reduced weight of the material. Further, because a progressive die may provide an increased stroke rate (e.g., strokes per minute), as compared to a transfer die, the efficiency of the stamping processes may be significantly greater than the efficiency of the drawing processes. In addition, bending via stamping processes may produce one-piece seat back structures with higher tolerances than drawing process. It should also be noted that variances in flatness and position of portions of the structure may be readily reshaped to reduce any detected variances. Consequently, a one-piece seat back structure formed by bending may be less expensive to produce and more dimensionally accurate than seat back structures formed by drawing processes.

Figure 2:
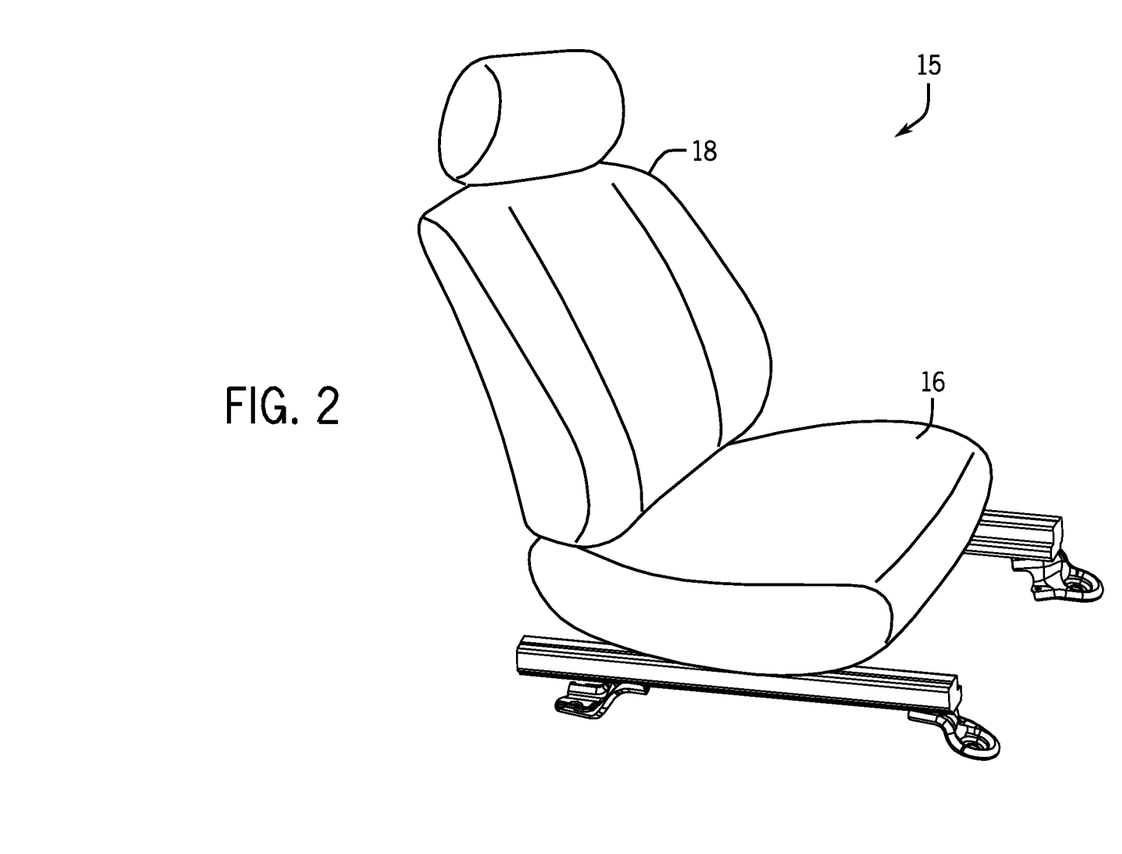
FIG. 2 is a perspective view of one of the seats shown in FIG. 1.

FIG. 2 is a perspective view of one of the seats 14 shown in FIG. 1. As illustrated, a seat 15 includes a seat bottom 16 and a seat back 18. In the present embodiment, the seat bottom 16 and the seat back 18 include a rigid structure, one or more cushions, and a fabric covering. The rigid structures serve to support the weight of a passenger during normal vehicle operation and during a vehicular impact (e.g., rapid acceleration or deceleration, etc.). Furthermore, the seat bottom structure secures the seat bottom 16 to a floor of the vehicle 10, and provides a mounting surface for the seat back 18. As will be appreciated, any of the seats 14 of FIG. 1 may be constructed in a manner similar to the seat 15 of FIG. 2. Further, as discussed in detail below, the seat back structure may be formed by bending a single piece of material via multiple stamping processes, thereby reducing construction costs compared to structures formed by drawing processes.

Figure 3:
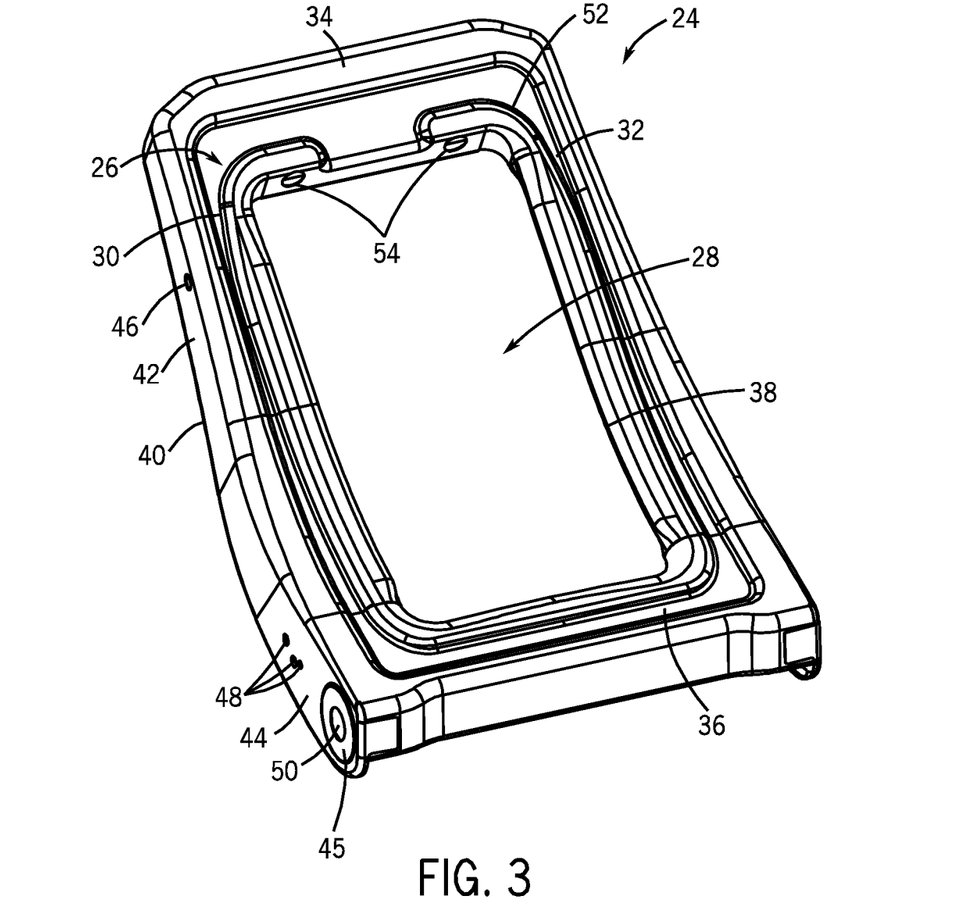
FIG. 3 is a back perspective view of an embodiment of a one-piece seat back structure that may be employed within the seat of FIG. 2.

FIG. 3 is a back perspective view of an embodiment of a one-piece seat back structure 24 that may be employed within the seat 15 of FIG. 2. As will be appreciated, a similar seat back structure may be employed with any of the seats 14. As illustrated, the seat back structure 24 includes a web, such as the illustrated shaped web 26, extending about a central opening 28. In the illustrated embodiment, the web 26 includes a left side member 30, a right side member 32, a top cross member 34, and a bottom cross member 36, forming a substantially rectangular structure. The seat back structure 24 also includes an inner flange 38 extending about an inner perimeter of the web 26 adjacent to the central opening 28. Specifically, the inner flange extends along an inner side of the left side member 30, the right side member 32, the top cross member 34, and the bottom cross member 36. In addition, the seat back structure 24 includes an outer flange 40 extending about an outer perimeter of the web 26 along an outer side of the left side member 30, the right side member 32, the top cross member 34, and the bottom cross member 36. As discussed in detail below, the inner flange 38, the outer flange 40, and the web 26 form a channel extending about the seat back structure 24. The channel enhances the strength of the seat back structure 24, thereby providing a lighter and/or stronger structure than structures having an inner flange or an outer flange that only extends about a portion of the web. The channel also provides a suitable area for mounting a cushion to the seat back structure.

In the illustrated embodiment, the outer flange 40 extending from the left and right side members 30 and 32 includes a first region 42 and a second region 44. The second region 44 is oriented approximately perpendicular to the web 26, thereby providing a surface configured to facilitate precise mounting of ancillary structures. For example, a cushion to the seat back structure may be mounted to the second region 44 using mounting embossment rings 45 disposed on opposite sides of the seat back structure 24. Further, a recliner mechanism may also be mounted to the second region 44 adjacent to the bottom cross member 36. The recliner mechanism may be coupled to the second region 44 of the outer flange 40 via a variety of mounting arrangements, thereby enabling the seat back structure 24 to recline relative to the seat bottom chassis. In contrast, the first region 42, which is positioned above the second region 44, is angled more than 90 degrees laterally outward from the web.

The left side member 30 and the right side member 32 may each include openings to facilitate attaching devices to the seat back structure 24 and/or to facilitate mounting the seat back structure 24. For example, the seat back structure 24 may include openings 46, 48, and 50. Specifically, the openings 50 may be used for mounting the recliner mechanism to the seat back structure 24.

The seat back structure 24 also includes a variety of beads configured to enhance the structural rigidity of the structure without increasing the weight. As illustrated, a bead 52 extends along the left side member 30, the right side member 32, the top cross member 34, and the bottom cross member 36. While a single bead extends along each side member in the illustrated embodiment, it should be appreciated that alternative embodiments may include more or fewer beads. For example, each side member, the top member, and the bottom member may include 1, 2, 3, 4, or more beads to enhance the longitudinal rigidity of the seat back structure 24. As will be appreciated, the length, width and shape of each bead may be particularly configured to establish the desired structural rigidity of the seat back structure 24.

As illustrated, the inner flange 38 extending from the top cross member 34 of the web 26 includes two openings 54 configured to receive and support a headrest assembly. As discussed in detail below, the seat back structure 24 may be formed in a variety of configurations to support the headrest assembly. For example, the top cross member 34 may include openings and tabs to enable an operator or an automated system to couple the headrest assembly to the top cross member 34. While two openings 54 are included in the illustrated embodiment, it should be appreciated that more or fewer openings (e.g., 1, 2, 3, 4, or more) may be employed in alternative embodiments.

In the illustrated embodiment, the seat back structure 24 is formed from a single piece of material. Specifically, each feature of the seat back structure 24 (e.g., the web 26, the inner flange 38, the outer flange 40, the bead 52, etc.) is formed by a single bend or series of bends via a corresponding stamping process, such as by using a progressive die. In this manner, manufacturing costs associated with seat back structure construction may be substantially reduced, as compared to drawing processes, such as by using a transfer die. In addition, because the illustrated one-piece seat back structure is formed by bending via a corresponding stamping process, wasted material may be substantially reduced, as compared to manufacturing using a drawing process.

Figure 4:
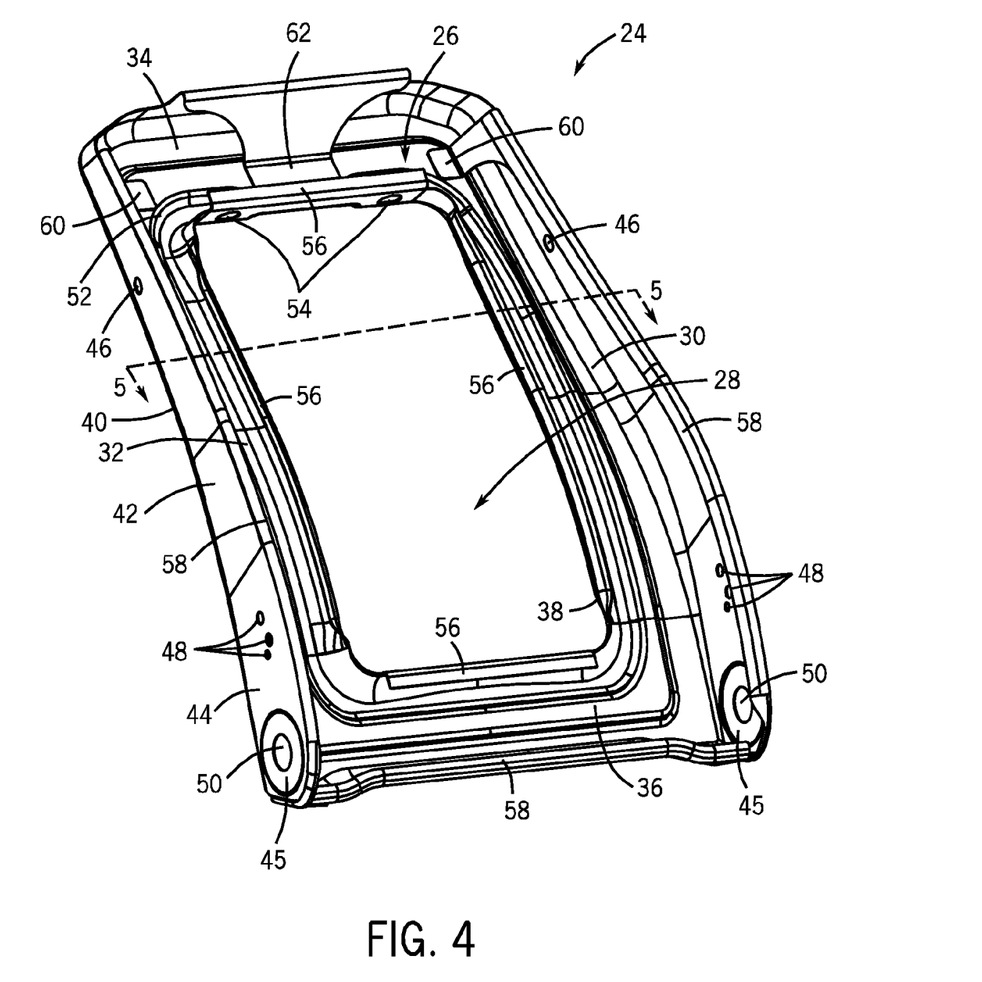
FIG. 4 is a front perspective view of the seat back structure of FIG. 3.

FIG. 4 is a front perspective view of the seat back structure 24 of FIG. 3. In the illustrated embodiment, the inner flange 38 includes a lip 56 extending about a portion of the flange 38. Specifically, the lip 56 is formed adjacent to the left side member 30, the right side member 32, the top cross member 34, and the bottom cross member 36. The lip 56 provides added structural rigidity to the seat back structure 24 without significantly increasing the weight. In addition, the outer flange 40 includes a lip 58 extending about a portion of the flange 40 adjacent to the left side member 30, the right side member 32, the top cross member 34, and the bottom cross member 36. Similar to the inner lip 56, the outer lip 58 increases the rigidity of the seat back structure 24, thereby enabling the structure to resist loads associated with vehicular impacts (e.g., rapid accelerations or decelerations). The left side member 30 and the right side member 32 include side tabs 60 that facilitate mounting portions of the seat 15 to the seat back structure 24, thereby obviating certain additional structural members used to resist loads. Further, the top cross member 34 includes a top tab 62 to provide structural support to a headrest assembly, and to facilitate mounting the headrest assembly to the seat back structure 24 without certain additional structural members.

In some embodiments, the seat back structure 24 may be formed from a tailor welded blank. A tailor welded blank includes multiple layers of steel and/or other materials (e.g., aluminum, etc.) welded together to form a blank having desired structural properties. For example, certain regions of the blank may have increased thickness (e.g., via welding additional layers of material to the blank) to enhance structural rigidity. Other regions of the blank may include material having greater ductility and/or malleability to facilitate formation of complex shapes. As a result, once the tailor welded blank is formed (e.g., via a stamping process) into the desired shape, the resultant structure (e.g., seat back structure 24) may include complex geometric shapes, while providing the desired strength and structural rigidity.

Figure 5:
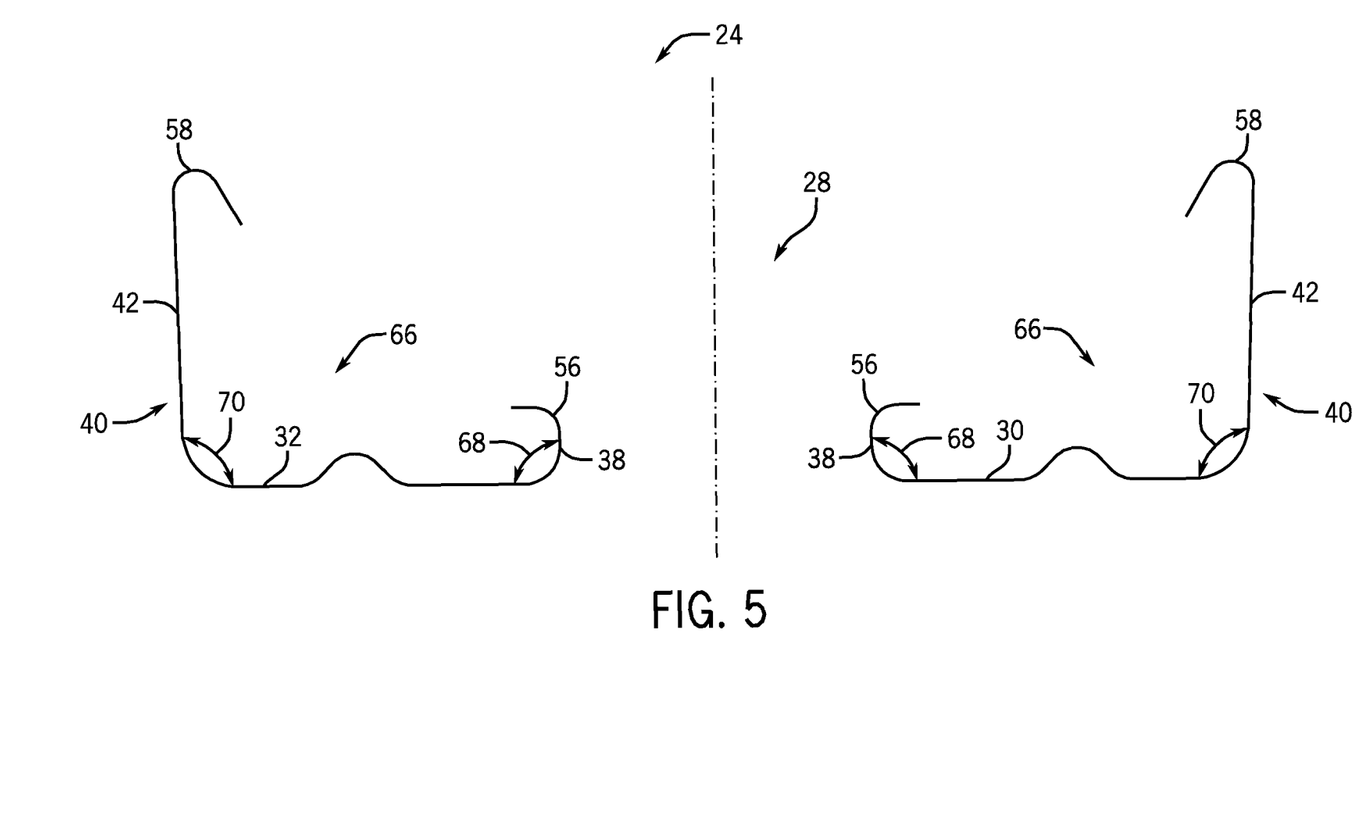
FIG. 5 is a cross-sectional view of the seat back structure of FIG. 4, taken along line 5-5.

FIG. 5 is a cross-sectional view of the seat back structure of FIG. 4, taken along line 5-5. As illustrated, the inner flange 38, the outer flange 40 and the web 32 form a channel 66 extending about the seat back structure 24. As previously discussed, the channel 66 enhances the structural rigidity of the seat back structure 24, thereby providing a lighter and/or stronger structure compared to structures having an inner flange or an outer flange that only extends about a portion of the web. In the illustrated embodiment, the inner flange 38 is oriented laterally inward from the web 26 at an angle 68. While the angle 68 is approximately 90 degrees in the illustrated embodiment, it should be appreciated that a larger or smaller angle may be employed in alternative embodiments. In addition, the first region 42 of the outer flange 40 is oriented more than 90 degrees laterally outward from the web 26 at an angle 70, thereby providing a more rigid structure than a perpendicular outer flange. As will be appreciated, the angles 68 and 70 may be particularly selected to provide the desired rigidity and/or strength. Similarly, the width of the web 26, the length of the inner flange 38, and/or the length of the outer flange 40 may be selected to provide the seat back structure 24 with the desired structural properties.

Figures 6, 7, 8:
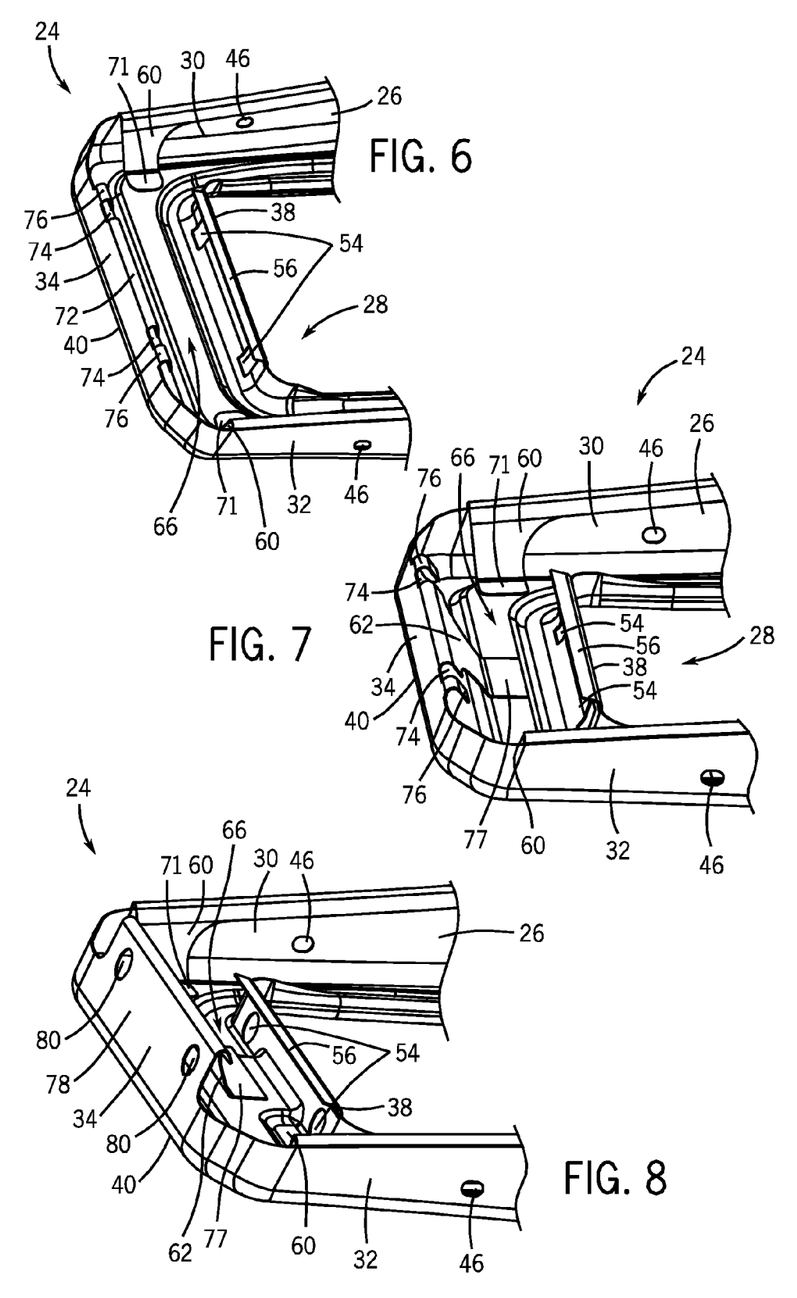
FIG. 6 is a perspective view of an embodiment of headrest assembly mounting features formed as part of a one-piece seat back structure.
FIG. 7 is a perspective view of an alternative embodiment of headrest assembly mounting features formed as part of a one-piece seat back structure.
FIG. 8 is a perspective view of another embodiment of headrest assembly mounting features formed as part of a one-piece seat back structure.

FIG. 6 is a perspective view of an embodiment of headrest assembly mounting features formed as part of the one-piece seat back structure 24. An upper portion of the seat back structure 24 is illustrated. The headrest assembly mounting features include the openings 54 and the lip 56 previously described. In this embodiment, the openings 54 are square or rectangular to facilitate mounting a headrest assembly with square or rectangular support rods. Furthermore, the side tabs 60 provide additional support to the headrest assembly. As illustrated, the side tabs 60 are bent toward the channel 66, and include a flat end 71 extending generally parallel to the channel 66. The headrest assembly mounting features also include a top tab 72 adjacent to slots 74. The top tab 72 and guide tabs 76 form the slots 74, which are used to guide headrest rods toward the openings 54. As illustrated, the top tab 72 and the guide tabs 76 extend parallel to the outer flange 40 and toward the channel 66. Further, the slots 74 are formed to have generally right angles. However, in other embodiments, the slots 74 and/or openings 54 may be any suitable shape, such as round, triangular, trapezoidal, and so forth. With features such as the openings 54, the slots 74, and the tabs 72, 76, and 60, the seat back structure 24 provides structural support and mounting locations for the headrest assembly without employing additional mounting hardware. As such, the duration and quantity of material associated with manufacturing the seat back structure 24 may be substantially reduced, thereby resulting in decreased manufacturing costs.

FIG. 7 is a perspective view of an alternative embodiment of headrest assembly mounting features formed as part of the one-piece seat back structure 24. The illustrated mounting features include the openings 54, the lip 56, and the side tabs 60, as shown and described above with reference to FIG. 6. In the illustrated embodiment, the slots 74 are formed by the tabs 62 and 76. In contrast to the embodiment described above with reference to FIG. 6, the tabs 62 and 76 extend at an angle away from the outer flange 40 and toward the inner flange 38. In addition, the top tab 62 includes a flat end 77 that extends generally parallel to the channel 66. These mounting features enable the seat back structure 24 to provide structural support and mounting locations for the headrest assembly without employing additional mounting hardware.

FIG. 8 is a perspective view of another embodiment of headrest assembly mounting features formed as part of the one-piece seat back structure 24. The illustrated mounting features include an extended top surface 78 having openings 80. The headrest assembly mounting features also include the side tabs 60 and the openings 54. As illustrated, the openings 54 and 80 are generally circular. However the openings 54 and 80 may be any other suitable shape in alternative embodiments. Like the embodiments described above with reference to FIGS. 6 and 7, the seat back structure 24 is able to provide structure support and mounting locations for the headrest assembly without employing additional mounting hardware.

Figure 9:
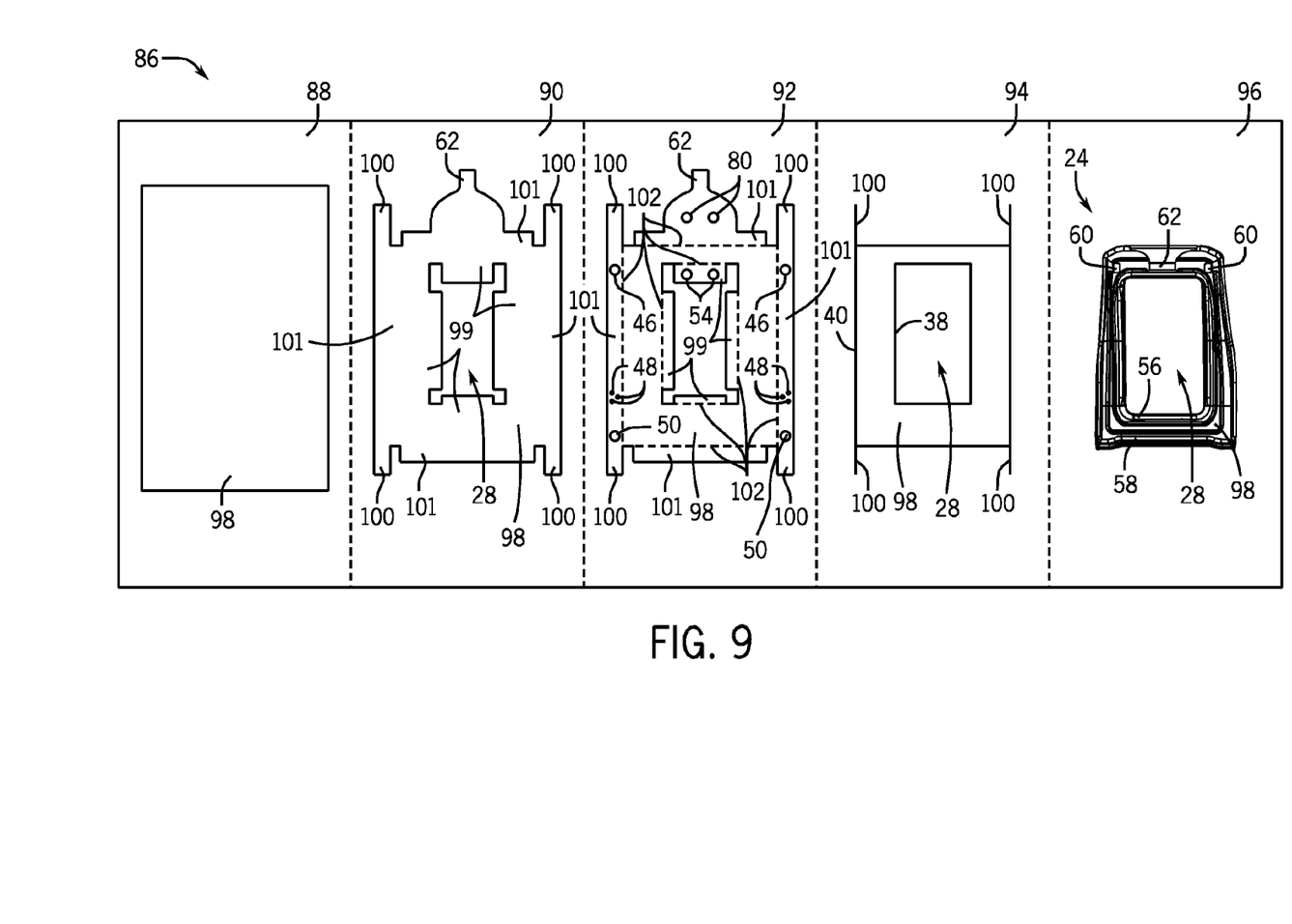
FIG. 9 is a process flow diagram of an embodiment of a method for manufacturing a one-piece seat back structure using a progressive die.

FIG. 9 is a process flow diagram of an embodiment of a method 86 for manufacturing a one-piece seat back structure using a progressive die. As will be appreciated, the progressive die may include a series of multiple operations, such as stamping, cutting, bending, punching, and so forth. The illustrated process flow diagram provides a generic illustration of how certain portions of the seat back structure 24 may be formed using a progressive die. For example, operations 88, 90, 92, 94, and 96 may be performed as part of a progressive die. In certain embodiments, the operations 88, 90, 92, 94, and 96 may each include one or more stamping operations.

During operation 88, a single piece of material 98 (e.g., sheet metal) enters the progressive die. Then, during operation 90, the material 98 is cut to enable the formation of various features of the seat back structure 24. For example, the central opening 28 may be cut out of the material 98. As illustrated, after various cutting operations are performed, portions 99 of the material 98 may extend into the central opening 28. As will be appreciated, these portions 99 may be bent at a later stage to form the inner flange 38. Further, the perimeter of the material 98 may be cut to enable the formation of other features of the seat back structure 24. For example, the material 98 may be cut such that tabs 100 extend out of the material 98 at the corners, and portions 101 of the material 98 extend along the edges. The tabs 100 and the portions 101 may be used to form the outer flange 40 at a later stage in the process. As illustrated, the material 98 is cut to establish the top tab 62. It should be noted that the cutting stages described above may be performed using one or more stamping processes of the progressive die.

Next, during operation 92, the material 98 enters a punching phase, in which openings are punched through the material 98. For example, openings 46, 48, 50, 54, and 80 may be punched during this phase. Again, it should be noted that the material 98 may be punched using a stamping operation. Also illustrated are potential bend locations 102, along which the material 98 may be bent during operation 94. Specifically, during operation 94, the portions 99 may be bent to form the inner flange and the portions 101 may be bent to form the outer flange 40. After operation 94 is complete, the tabs 100 still extend outwardly at the corners of the material 98. Like the other operations, operation 94 may use a stamping process to establish the desired bends.

During operation 96, the material 98 may be further bent to form the lips 56 and 58, the side tabs 60, and the top tab 62. In addition, the tabs 100 may be bent into a position around the outer flange 40. In certain embodiments, the tabs 100 may be welded to the outer flange 40 to hold the tabs 100 in place. As will be appreciated, before welding the tabs 100 to the outer flange 40, a width of the seat back structure 24 may be adjusted based on a desired tolerance. Again, the bending stages may use a stamping process. As such, the seat back structure 24 may be formed using a progressive die that includes various operations. Using such a manufacturing method allows the seat back structure 24 to be formed quickly while limiting material waste, as compared to other manufacturing techniques, such as drawing. As will be appreciated, the method of manufacturing described above is a simplified example of how certain features of the progressive die may operate. During actual implementation, the operations described above may be combined into fewer operations and/or expanded into additional operations. For example, the number of operations may depend on the complexity of the operations being performed.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A method of manufacturing a seat back structure, comprising:
bending a single piece of material via a plurality of stamping processes to form the seat back structure, wherein the seat back structure comprises a web extending about a central opening, an inner flange extending about an inner perimeter of the web adjacent to the central opening, and an outer flange extending about an outer perimeter of the web, wherein the inner flange is formed by bending via a first stamping process of the plurality of stamping processes, and the outer flange is formed by bending via a second stamping process of the plurality of stamping processes;
wherein bending the single piece of material comprises bending a plurality of support tabs, each extending from the outer flange; and
wherein bending the plurality of support tabs comprises bending each support tab of the plurality of support tabs toward the web, such that each support tab of the plurality of support tabs includes a first portion angled toward the web and a second portion extending from the first portion to a distal end of the support tab, wherein the second portion is substantially flat and extends substantially parallel to the web.

2. The method of claim 1, wherein bending the single piece of material comprises bending a first lip along at least a portion of the inner flange via the first stamping process, or bending a second lip along at least a portion of the outer flange via the second stamping process.

3. The method of claim 1, wherein bending the single piece of material comprises bending a portion of the outer flange approximately perpendicular to the web via the second stamping process to facilitate mounting a recliner mechanism to the seat back structure.

4. The method of claim 1, wherein bending the single piece of material comprises bending the single piece of material using a progressive die.

5. The method of claim 1, comprising cutting the single piece of material to a desired shape before bending the single piece of material.

6. The method of claim 5, wherein cutting the single piece of material comprises cutting the single piece of material to form the central opening.

7. The method of claim 1, comprising punching one or more holes in the single piece of material to form a mounting portion of the seat back structure.

8. The method of claim 1, comprising welding corner tabs of the single piece of material together to form corners of the seat back structure.

9. The method of claim 1, wherein bending the single piece of material comprises forming a headrest rod receiving slot in the outer flange by bending a first tab on a first side of the headrest rod receiving slot toward the web and bending a second tab on a second side of the headrest rod receiving slot toward the web.

10. The method of claim 1, comprising punching a headrest rod receiving opening in the outer flange.

11. A method of manufacturing a seat back structure, comprising:
   cutting a single piece of material to a desired shape;
   punching one or more holes in the single piece of material to form a mounting portion of the seat back structure; and
   stamping the single piece of material via a plurality of stamping processes to form the seat back structure, wherein the seat back structure comprises a web extending about a central opening, an inner flange extending about an inner perimeter of the web adjacent to the central opening, and an outer flange extending about an outer perimeter of the web, wherein the inner flange, the outer flange and the web form a channel extending about the seat back structure;
   wherein the inner flange is formed by bending via a first stamping process of the plurality of stamping processes, and the outer flange is formed by bending via a second stamping process of the plurality of stamping processes;
   wherein stamping the single piece of material comprises bending a plurality of support tabs, each extending from the outer flange; and
   wherein bending the plurality of support tabs comprises bending each support tab of the plurality of support tabs toward the web, such that each support tab of the plurality of support tabs includes a first portion angled toward the web and a second portion extending from the first portion to a distal end of the support tab, wherein the second portion is substantially flat and extends substantially parallel to the web.

12. The method of claim 11, wherein stamping the single piece of material comprises bending a first lip along at least a portion of the inner flange, or bending a second lip along at least a portion of the outer flange.

13. The method of claim 11, wherein stamping the single piece of material comprises bending a portion of the outer flange approximately perpendicular to the web to facilitate mounting a recliner mechanism to the seat back structure.

14. The method of claim 11, comprising welding corner tabs of the single piece of material together to form corners of the seat back structure.

15. The method of claim 11, wherein stamping the single piece of material comprises forming a headrest rod receiving slot in the outer flange by bending a first tab on a first side of the headrest rod receiving slot toward the web and bending a second tab on a second side of the headrest rod receiving slot toward the web.

16. The method of claim 15, wherein the plurality of support tabs comprises the first tab.

17. A seat back structure formed from a single piece of material, comprising:
   a web extending about a central opening;
   an inner flange extending about an inner perimeter of the web adjacent to the central opening, the inner flange formed by stamping the single piece of material;
   an outer flange extending about an outer perimeter of the web, the outer flange formed by stamping the single piece of material, wherein the inner flange, the outer flange, and the web form a channel extending about the seat back structure; and
   a plurality of support tabs, each extending from the outer flange toward the web, wherein each support tab of the plurality of support tabs includes a first portion angled toward the web and a second portion extending from the first portion to a distal end of the support tab, wherein the second portion is substantially flat and extends substantially parallel to the web.

18. The seat back structure of claim 17, wherein the outer flange comprises a first tab bent toward the web, a second tab bent toward the web, and a headrest rod receiving slot formed between the first tab and the second tab.

19. The seat back structure of claim 18, wherein the plurality of support tabs comprises the first tab.

20. The seat back structure of claim 17, wherein the outer flange includes a headrest rod receiving opening.

* * * * *